United States Patent
Vasileiadis et al.

(10) Patent No.: US 11,663,051 B2
(45) Date of Patent: May 30, 2023

(54) WORKFLOW PIPELINE OPTIMIZATION BASED ON MACHINE LEARNING OPERATION FOR DETERMINING WAIT TIME BETWEEN SUCCESSIVE EXECUTIONS OF THE WORKFLOW

(71) Applicant: INTERNATIONAL BUSINESS MACHINES CORPORATION, Armonk, NY (US)

(72) Inventors: Vasileios Vasileiadis, Dublin (IE); Michael Johnston, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 528 days.

(21) Appl. No.: 16/736,280

(22) Filed: Jan. 7, 2020

(65) Prior Publication Data

US 2021/0208953 A1    Jul. 8, 2021

(51) Int. Cl.
G06F 9/50 (2006.01)
G06N 20/00 (2019.01)
G06F 9/48 (2006.01)

(52) U.S. Cl.
CPC .......... *G06F 9/5083* (2013.01); *G06F 9/4887* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,463,346 B1 | 10/2002 | Flockhart et al. | |
| 7,783,468 B2 | 8/2010 | Abu El Ata et al. | |
| 7,865,867 B2 | 1/2011 | Potter et al. | |
| 8,090,611 B2 | 1/2012 | Hodges et al. | |
| 9,235,446 B2 | 1/2016 | Bruno et al. | |
| 11,055,273 B1* | 7/2021 | Meduri | G06F 16/2358 |
| 11,170,307 B1* | 11/2021 | Ross | G06N 5/022 |
| 2003/0181991 A1 | 9/2003 | Keene et al. | |
| 2006/0004618 A1 | 1/2006 | Brixius | |
| 2008/0195446 A1 | 8/2008 | Bowler | |
| 2010/0042582 A1 | 2/2010 | Aggarwal et al. | |
| 2010/0060651 A1* | 3/2010 | Gala | G06T 15/005 345/506 |
| 2011/0154358 A1* | 6/2011 | Di Balsamo | G06F 9/505 718/105 |

(Continued)

OTHER PUBLICATIONS

Dong et al., "PFAS: a resource-performance-fluctuation-aware workflow scheduling algorithm for grid computing." 2007 IEEE International Parallel and Distributed Processing Symposium. IEEE, 2007 ( 9 Pages).

(Continued)

*Primary Examiner* — Meng Ai T An
*Assistant Examiner* — Zujia Xu
(74) *Attorney, Agent, or Firm* — Griffiths & Seaton PLLC

(57) ABSTRACT

Embodiments are provided for providing workflow pipeline optimization in a computing environment. Execution of a workflow containing dependencies between one or more subject nodes and one or more observer nodes may be dynamically optimized by determining a wait time between successive executions of the workflow for the one or more observer nodes.

17 Claims, 10 Drawing Sheets

(56) References Cited

U.S. PATENT DOCUMENTS

| | | | | |
|---|---|---|---|---|
| 2015/0356518 | A1* | 12/2015 | De | G06F 3/0481 |
| | | | | 705/7.21 |
| 2016/0350683 | A1* | 12/2016 | Bester | G06Q 10/0633 |
| 2017/0102942 | A1* | 4/2017 | Veith | G06F 9/30145 |
| 2017/0337492 | A1 | 11/2017 | Chen et al. | |
| 2021/0019612 | A1* | 1/2021 | Carrasco | G06N 3/0445 |
| 2021/0295984 | A1* | 9/2021 | Prokle | G06Q 10/06393 |

OTHER PUBLICATIONS

Blythe et al. "Task scheduling strategies for workflow-based applications in grids." CCGrid 2005. IEEE International Symposium on Cluster Computing and the Grid, 2005.. vol. 2. IEEE, 2005. (9 Pages).

Krish et al., "[phi] sched: A heterogeneity-aware hadoop workflow scheduler." 2014 IEEE 22nd International Symposium on Modelling, Analysis & Simulation of Computer and Telecommunication Systems. IEEE, 2014. (10 Pages).

"A Truthful Dynamic Workflow Scheduling Mechanism for Commercial Multicloud Environments" Fard et al. Jun. 2013 doi: 10.1109/TPDS.2012.257.

"Workflow Management in Condor", Kent Wenger et al. Jan. 2007 htttps://doi.org/ 10.1007/978 1 84628 757 2_22 (21 Pages).

"Scheduling scientific workflows elastically for cloud computing." 2011 IEEE 4th International Conference on Cloud Computing. IEEE, 2011. ( 2 Pages).

"Multi objective workflow scheduling in Amazon EC2." Juan J. Durillo—Radu Prodan Cluster computing 17.2 (2014): 169 189. (21 Pages).

"Execution time estimation for workflow scheduling." Chirkin et al. Future Generation Computer Systems 75 (2017): 376 387. (3 Pages).

* cited by examiner

WORKFLOW PIPELINE OPTIMIZATION BASED ON MACHINE LEARNING OPERATION FOR DETERMINING WAIT TIME BETWEEN SUCCESSIVE EXECUTIONS OF THE WORKFLOW

GOVERNMENT LICENSE RIGHTS TO CONTRACTOR-OWNED INVENTIONS MADE UNDER FEDERALLY SPONSORED RESEARCH AND DEVELOPMENT

This invention was made with Government support under Contract no.: JDA W1464125 awarded by Science and Technology Facilities Council. The Government has certain rights to this invention.

BACKGROUND OF THE INVENTION

Field of the Invention

The present invention relates in general to computing systems, and more particularly, to various embodiments for providing workflow pipeline optimization in a computing environment using a computing processor.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. The amount of information to be processed nowadays increases greatly. Therefore, processing, storing, and/or retrieving various amounts of information is a key problem to solve.

SUMMARY OF THE INVENTION

Various embodiments for providing workflow pipeline optimization in a computing environment by a processor, are provided. In one embodiment, by way of example only, a method for providing workflow pipeline optimization in a computing environment, again by a processor, is provided. Execution of a workflow containing dependencies between one or more subject nodes and one or more observer nodes may be dynamically optimized by determining a wait time between successive executions of the workflow for the one or more observer nodes.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
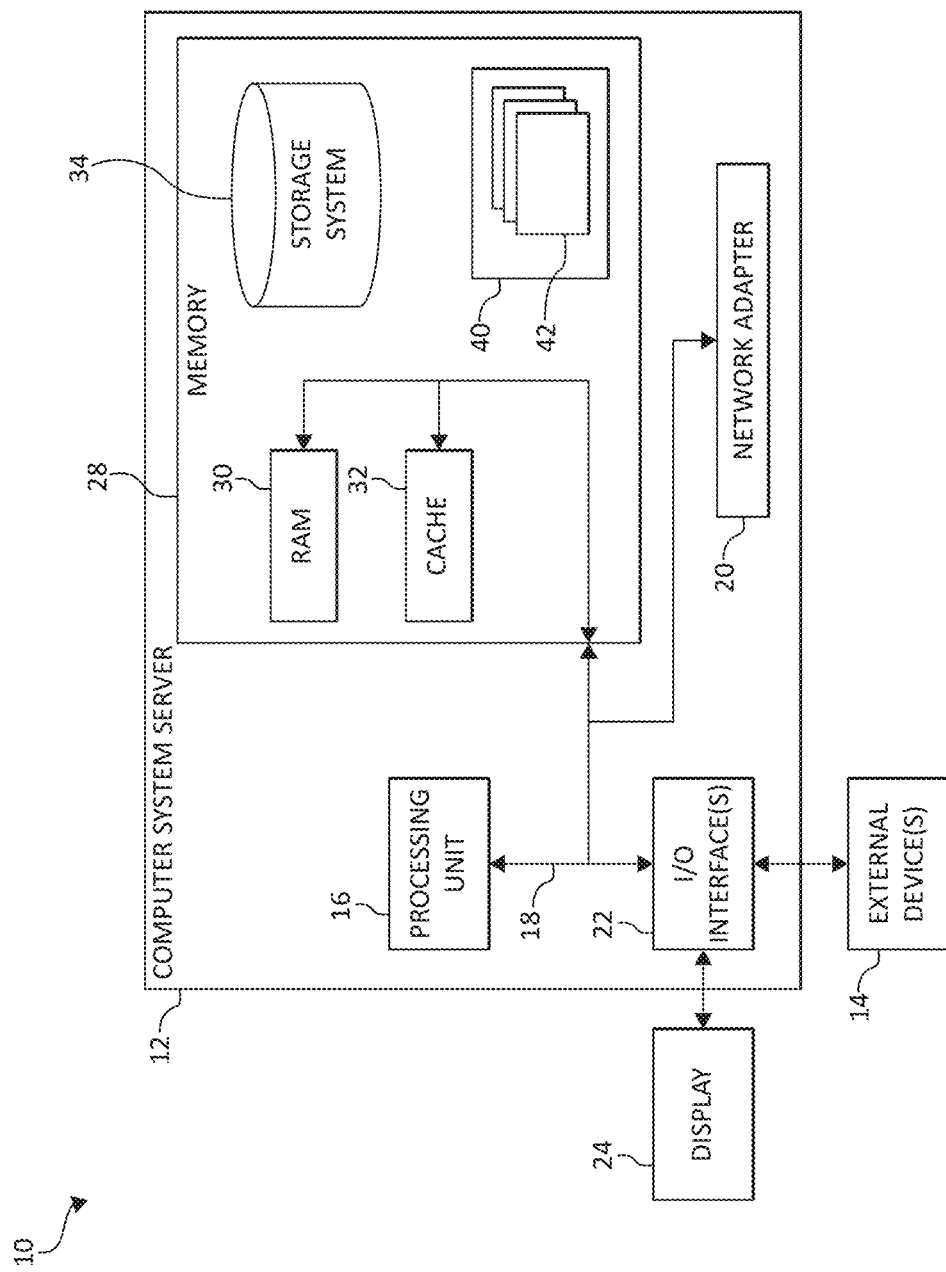
FIG. 1 is a block diagram depicting an exemplary cloud computing node according to an embodiment of the present invention.

Workflow management provides an infrastructure for the set-up, performance and monitoring of defined tasks in a process that may be arranged as a workflow. Current workflow systems assume that a model of the process is available and the main task of the system is to ensure that all the activities are performed in the right order and the process terminates successfully. Individual tasks of a workflow process may depend on the completion of a previous task before starting and completing a subsequent task. A delay in completing any previous tasks at any stage of the process may have a cascading effect which may in turn delay the completion of the subsequent tasks, therefore delaying the completion of the entire process.

Accordingly, various embodiments, as described herein, provide for workflow pipeline optimization and task scheduling. In one aspect, execution of a workflow containing dependencies between one or more subject nodes and one or more observer nodes may be dynamically optimized by determining a wait time between successive executions of the workflow for the one or more observer nodes. Thus, the time it takes for one or more nodes within a workflow to produce output may be minimized without increasing the consumption of computational resources (especially when the nodes do not provide push notifications downstream about their activity).

In one aspect, the present invention dynamically computes an optimal time to wait between successive executions of observer nodes within the context of a workflow. The present invention may use a scheduling policy for nodes which have at least one subject-observer input dependency and any number of consumer-producer input dependencies. The present invention uses a bookkeeping ledger to maintain/keep track of changes to the state of each of the nodes and/or tasks. The present invention uses a model builder that the optimizer uses to model the behavior of each of the nodes. An optimizer is provided that uses the bookkeeping ledger and model builder to suggest a waiting time between successive tasks of the same observer node.

In one aspect, workflows may define/describe producer-consumer dependencies. For example, there may be one or more scenarios where it is possible to execute nodes in a pipeline operation, which improves an efficiency of an entire workflow because nodes may overlap their in-flight (i.e., execution, file-transfer, etc.) time. By pipelining the workflow, a makespan may decrease without incurring an increase in computational resources consumption. In such a scenario, one or more dependencies (e.g., producer-consumer node dependencies) may evolve into a subject-observer based dependency.

As used herein, a workflow may include one or more activities/applications and dependencies between one or more of the activities/applications. A workflow may be a graph (e.g., a directed acyclic graph) having one or more nodes and edge (e.g., may be represented as a graph with a plurality of nodes and edges). For example, the graph vertices may represent individual activities/applications (which may include performing one or more tasks and/or subtasks) and the edges represent dependencies between one or more activities/applications. The nodes may be applications and/or services and the edges may indicate dependencies between one or more of the nodes. For example, if activity A has to be executed before activity B, an edge appears in the graph from A to B.

A task (e.g., a task of the workflow), for example, may be the execution of an application/service. A make span (e.g., "makespan") may be defined as a time between two output emissions of the same workflow node. It should be noted that a node may "emit" multiple frames in a single emission. Thus, each node may be treated as "black-boxes." For example, node A may produce multiple comma-separated values ("CSV") files where each line contains some specification data for an experiment. Node B may consume the output of A. Specifically, node B executes 1 experiment (i.e., node B's input data is one line out of the many CSV files that node A produces. As such, when node A produces a CSV file that contains 10 lines of data (1 output emission) node B receives 10 input data. In this case, node B observes 10 output frames that are emitted in the same time.

The makespan of an entire workflow may be the makespan of one or more leaf nodes. A producer-consumer dependency may be defined as one or more consumer nodes that may only begin their execution once their respective producer(s) nodes have terminated. That is, a consumer node is dependent upon a producer node.

A subject-observer dependency may be defined as an observer node that may start executing once the observer node's subject node(s) go in their in-flight state (i.e., execute). That is, an observer node is dependent upon the subject node. An observer node may process the output of its subject node(s) over a course of a number of tasks. The observer node may only have a single task in-flight (i.e., executing).

It should be noted that a node receives the observer-consumer label with respect to some other upstream node. In other words, for example, node C may be a consumer of node A and an observer of node B. That means that node C waits for node A to terminate and for node B to start executing, as depicted in FIG. 6. At the penultimate level on the graph there is an (O) node at the very left, which receives an input from another (O) node in a 2nd level via a producer-consumer dependency and for this particular dependency node C may acts as a consumer. Node C may also receive an input from a node (O) in the same level via an observer-subject dependency. As such, this node is both a consumer and an observer at the same time. The only constraint is that if 2 nodes are connected via a data dependency the data dependency is either a producer-consumer or an observer-subject but it cannot be both at the same time.

An "effective delta time" may be the time that successful tasks that have been created, generated, and/or spawned by an input node (I) of an observer node (O) have been in-flight (e.g., executing) since the time that the last successful task of the observer transitioned to the in-flight state (e.g., transitioned to an "executing" state).

A "single task node" may be an operation/algorithm that has input dependencies to the outputs of a set of nodes. The single task node executes a task to consume one or more inputs and produces an output. A node may only begin executing its task once all of the input nodes of the single task node have successfully finished their execution. In general, all nodes have to wait for all of their producers to finish executing. However, a node may not have any producers if it is only part of subject-observer dependencies.

An "observer node" may be an operation/algorithm that processes the outputs of its input nodes (e.g., a mix of single task and observer nodes) using a sequence of tasks (as compared to one task). Contrary to a single fire node, the observer node may launch its first task before all of its input nodes have terminated. Specifically, the observer node may be capable of launching tasks as soon as its producer-consumer and subject-observer tasks are satisfied.

As used herein, by way of example only, "best," "appropriate," and/or "optimize" may be used herein interchangeable and refer to and/or defined as "maximize," "minimize," or attain one or more specific targets, objectives, goals, or intentions. "Best," "appropriate," and/or "optimize" may also refer to maximizing a benefit to a user (e.g., maximize a workflow pipeline). "Best," "appropriate," and/or "optimize" may also refer to making the most effective or functional use of a situation, opportunity, or resource.

Additionally, "best," "appropriate," and/or "optimize" may need not refer to a best solution or result but may refer to a solution or result that "is good enough" for a particular application, for example. In some implementations, an objective is to suggest a "best" combination of sections/items/defined objects, but there may be a variety of factors that may result in alternate suggestion of a combination of sections/items/defined objects/activities/applications yielding better results. Thus, some changes to the variety of factors may result in a jump from one minimum/maximum to another minimum/maximum. In either case, resulting suggestions of a combination of sections/items/defined objects/activities/applications of the optimal/best executor nodes may be determined by whatever "function" may be considered "good enough," "substantially optimal," and/or "sufficiently good." Herein, the terms "best," "appropriate," and/or "optimize" may also refer to such results based on minima (or maxima, depending on what parameters are considered in the optimization problem) for suggesting of a combination of optimal/best executor nodes.

In an additional aspect, the terms "optimize" and/or "optimizing" may refer to an operation performed in order to achieve an improved result such as, for example, reduced execution costs or increased resource utilization, whether or not the optimum result is actually achieved. Similarly, the term "optimize" may refer to a component for performing such an improvement operation, and the term "optimized" may be used to describe the result of such an improvement operation.

It should be noted as described herein, the term "intelligent" (or "intelligence") may be relating to, being, or involving conscious intellectual activity such as, for example, thinking, reasoning, or remembering, that may be performed using a machine learning. In an additional aspect, intelligent or "intelligence" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, intelligent or "intelligence" may refer to a mental action or process of acquiring knowledge and understanding through thought, experience, and one or more senses using machine learning (which may include using sensor-based devices or other computing systems that include audio or video devices). Intelligent or "intelligence" may also refer to identifying patterns of behavior, leading to a "learning" of one or more events, operations, or processes. Thus, the intelligent or "intelligence" model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to an intelligent or "intelligence" system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented intelligent operations that approximate a human thought process while enabling a user or a computing system to interact in a more natural manner. The intelligent system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16 (which may be referred to herein individually and/or collectively as "processor"), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
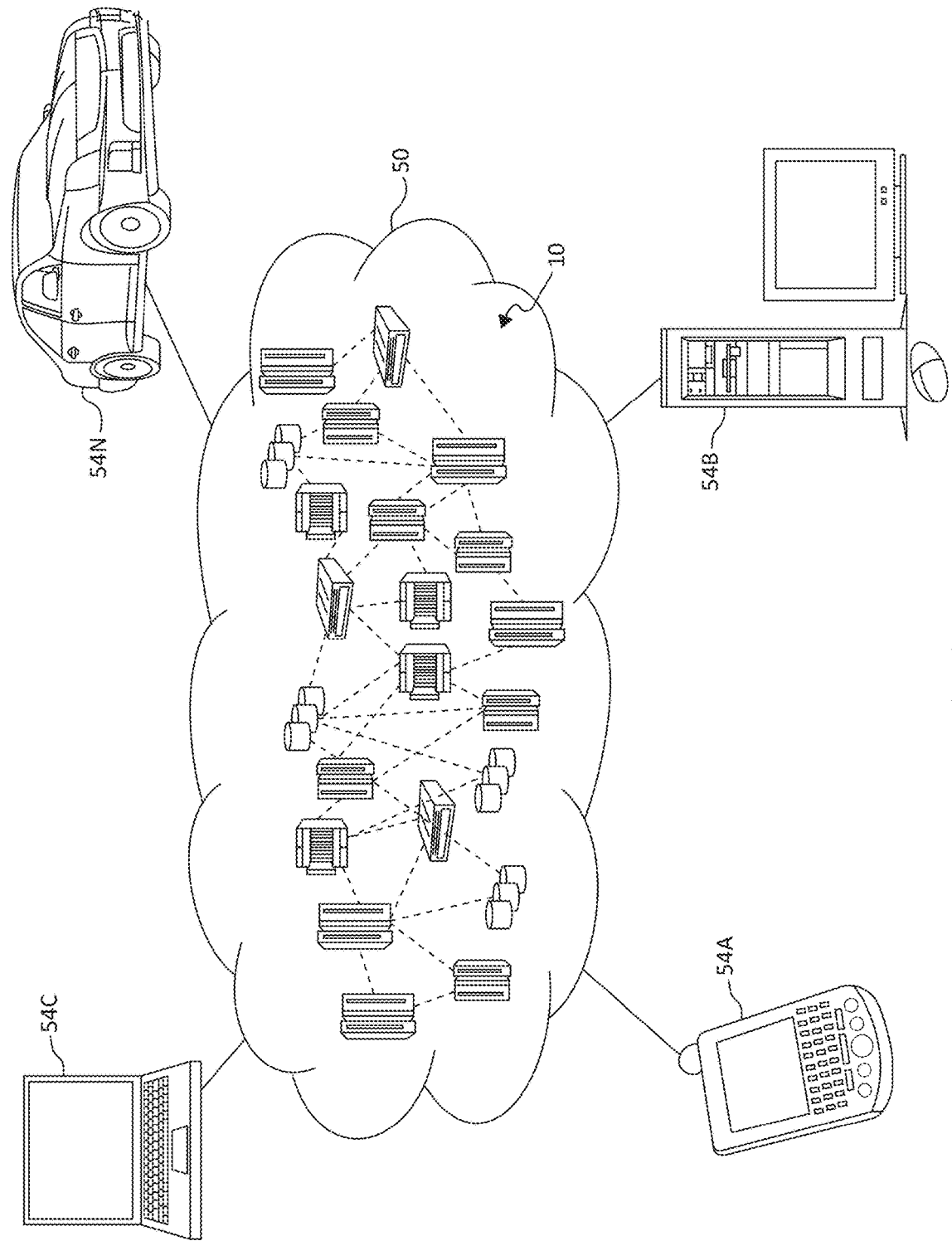
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
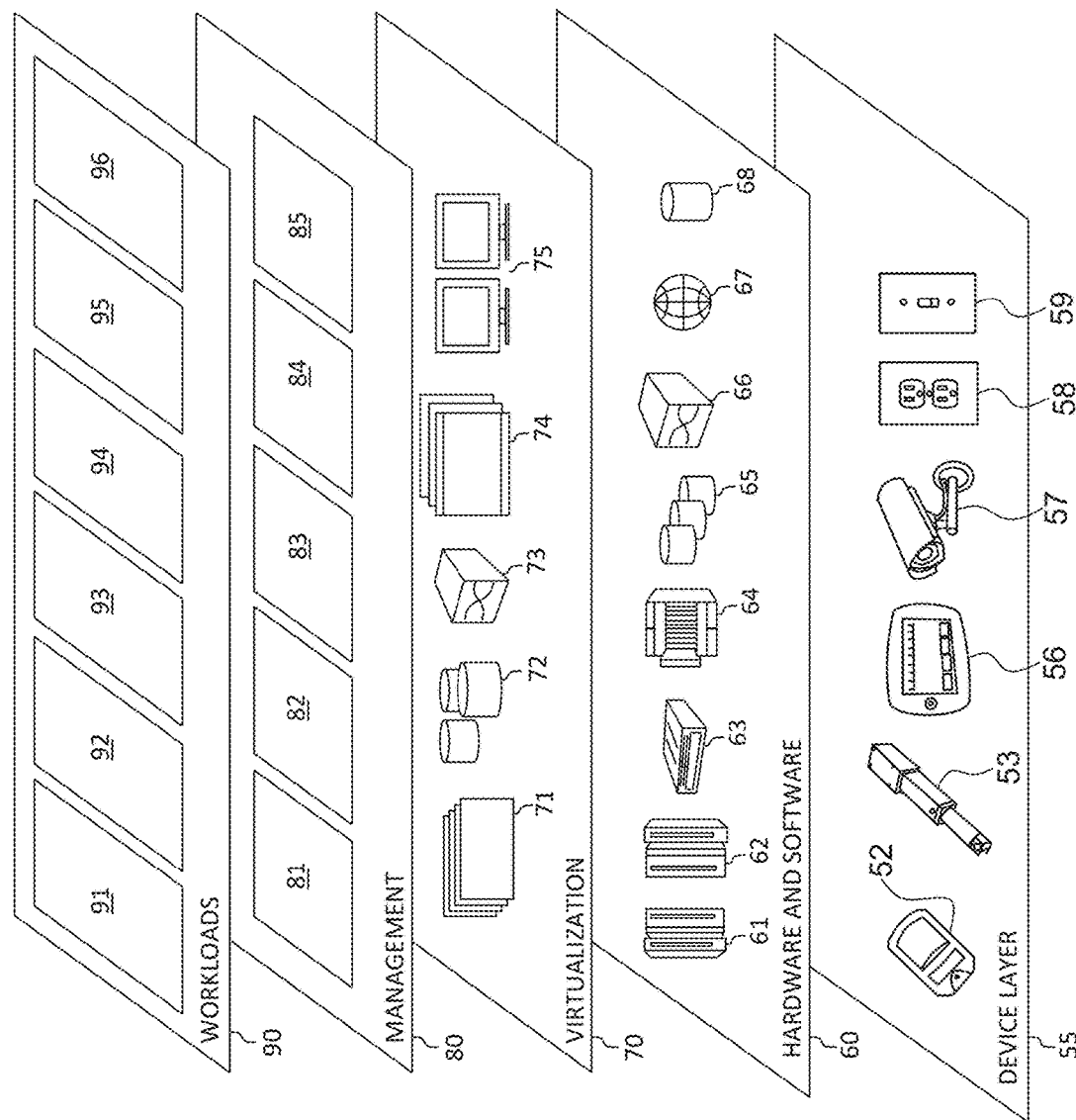
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing workflow pipeline optimization. In addition, workloads and functions 96 for providing workflow pipeline optimization may include such operations as data analysis, machine learning (e.g., artificial intelligence, natural language processing, etc.), user analysis, application/services execution and deployment, operation and/or analysis, as will be further described. One of ordinary skill in the art will appreciate that the workloads and functions 96 for providing workflow pipeline optimization may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for dynamically optimizing a workflow pipeline. In aspect, an execution of a workflow containing dependencies between one or more subject nodes and one or more observer nodes may be dynamically optimized by determining a wait time between successive executions of the workflow for the one or more observer nodes.

Figure 4:
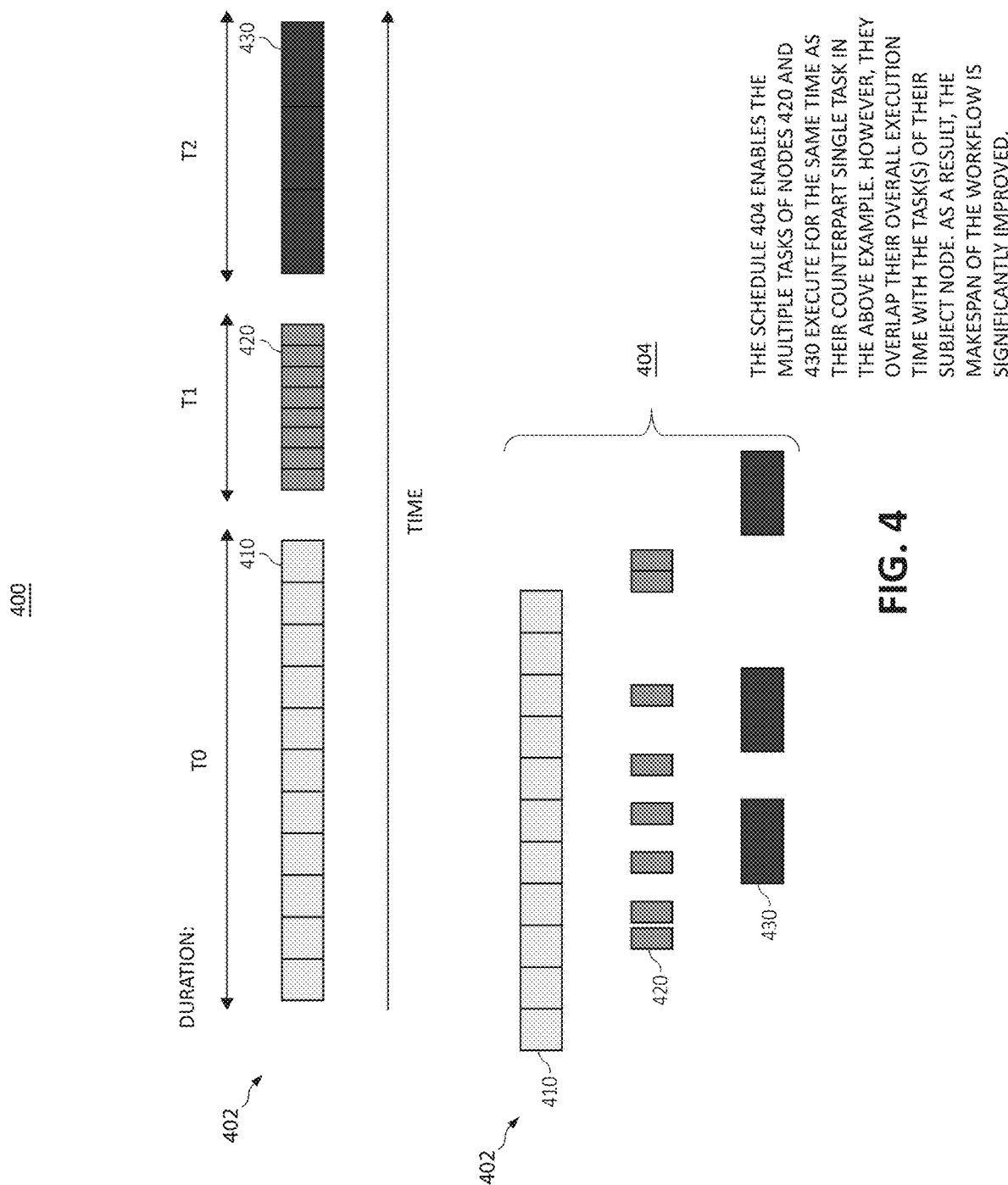
FIG. 4 is an additional block diagram depicting operations for a pipeline of nodes in which aspects of the present invention may be realized.

Turning now to FIG. 4, a block diagram depicting exemplary functional operations 400 for a pipeline of nodes. In one aspect, one or more of the components, modules, services, applications, and/or functions described in FIGS. 1-3 may be used in FIG. 4. For example, computer system/server 12 of FIG. 1 may be used for one or more operations for execution of the pipeline of nodes. As one of ordinary skill in the art will appreciate, the depiction of the various functional units for executing the operations 400 of FIG. 4 is for purposes of illustration, as the functional units may be located within the computer system/server 12 of FIG. 1 or elsewhere within and/or between distributed computing components.

In one embodiment, by way of example only, an operation 400 is depicted for a workflow 402 of a pipeline. The workflow 402 may include a sequence of one or more single task nodes such as, for example, single task node 410, 420, and 430 (collectively forming the workflow) that may be connected via producer-consumer dependencies. In one aspect, by way of example only, each block of each single task node 410, 420, and 430 may each represent a task. The time (e.g., T0, T1, and T2) for execution and completion of the workflow is the total time of time T0, time T1, and time T2 (e.g., Total time is equal all of three times "Total Time=T0+T1+T2").

In general, each node such as, for example, single task node 410, 420, and 430 waits for its producer (e.g., node 420 may be required to wait for node 410 and node 430 waits for node 420) and then launches a single task to output a number of output frames over time. For example, application programs that perform timestep simulations, streaming calculations, etc. may operate in this sequential process.

Applying the operations of the present invention, workflow 402 may employ two observer nodes (e.g., single task nodes 420 and 430), which launch the tasks of single task nodes 420 and 430. Again, it should be noted that the present invention enables the subject-observer type of dependency to overlap the execution time of an observer node and its subject nodes. For example, the pipeline schedule 404 of workflow 402, as depicted in FIG. 4, enables multiple tasks of the single task nodes 420 and 430 to simultaneously execute at same time as their counterpart single task node 410. However, the tasks of the single task nodes 420 and 430 may overlap their overall execution time with the task(s) of their subject node such as, for example, single task nodes 410. As a result, the makespan of the workflow 402 is significantly improved.

In an additional aspect, selecting the optimal amount of time to wait between successive executions of an observer node (e.g., single task node 430) may be challenging. For example, if the wait time is too short, the observer node (e.g., single task node 430) may attempt/try to consume novel output from each subject node such as, for example, single task node 410 and 420. Thus, the observer node (e.g., single task node 430) may eventually fail since its subjects (e.g., subject node such as, for example, single task node 410 and 420) may have insufficient time to produce a novel output, which leads to wasting computational resources. Moreover, if the wait time is too long, the time that the observer node (e.g., single task node 430) and its subject nodes such as, for example, single task node 410 and 420 overlap, is smaller than what is possible. In turn, the advantages of using a pipeline of nodes diminish. Accordingly, one or more machine learning operation (e.g., artificial intelligence "AI") may be employed (e.g., such as in the workflow 402 and schedule 404) to learn when to execute observer nodes (e.g., one or more components may be executed and the machine learning indicates to one or more producers to execute one or more tasks).

Figure 5:
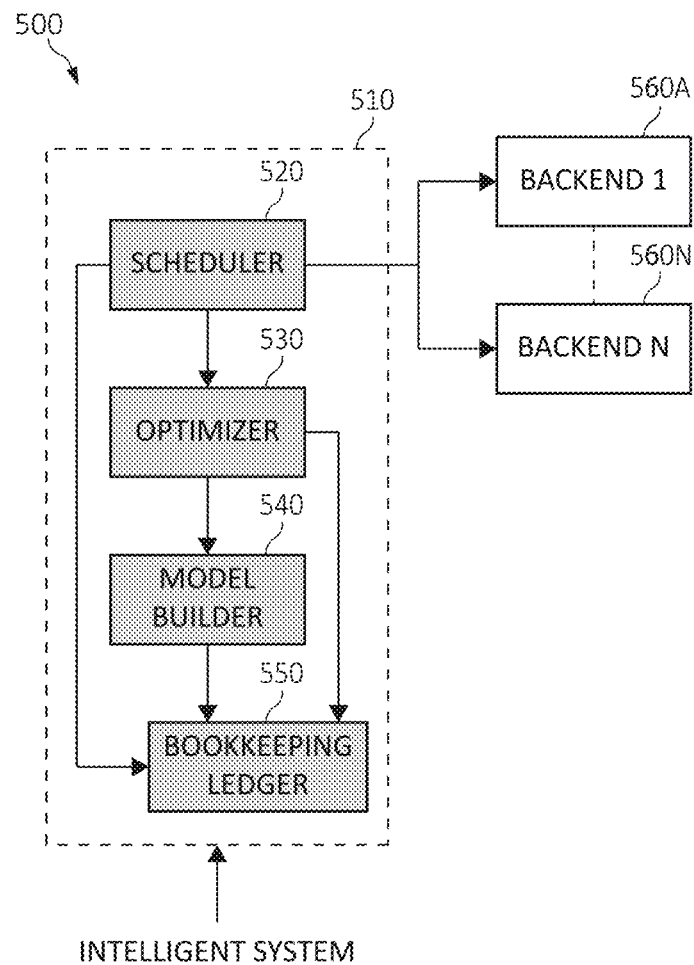
FIG. 5 is an additional block diagram depicting operations for providing workflow pipeline optimization in which aspects of the present invention may be realized.

Turning now to FIG. 5, a block diagram of exemplary functionality on an intelligent system 500 relating to workflow pipeline optimization is depicted according to various aspects of the present invention. In one aspect, one or more of the components, modules, services, applications, and/or functions described in FIGS. 1-4 may be used in FIG. 5.

As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere.

Starting with block 502, a scheduler 520 may submit one or more tasks of a node to a backend (e.g., backend 560A through backend 560 N). In one aspect, by way of example only, examples of backends may batch schedulers, operating systems ("OS"), Kubernetes, etc. In general, a backend may be systems that enables a workflow manager/systems to execute one or more tasks/jobs, monitor their execution, and receive information once the tasks/jobs terminate (such as how long they executed for, and whether they succeeded or not, among other details). A workflow scheduler such as, for example, the scheduler 520 may be a meta-scheduler with the purpose to understand each of the dependencies between nodes and schedule one or more tasks/jobs of nodes at appropriate times as well as provide mechanisms to handle tasks/job errors. The scheduler 520 may update a bookkeeping ledger 550 with information about tasks, nodes, and their input nodes. The scheduler 520 may consults an optimizer 530 prior to the scheduler 520 launching one or more tasks on behalf of an observer node.

In one aspect, the intelligent system 500, via the scheduler 520, may interface with the backends (e.g., backend 1 through backend N), which execute tasks on a platform/service. The intelligent system 500, via the scheduler 520, may also report information about each state of each of the tasks in a workflow.

As in block 550, the bookkeeping ledger 550 may collect information about one or more nodes, tasks, and dependencies between one or more of the nodes. The bookkeeping ledger 550 may receive, potentially delayed, updates about each state of the nodes and the tasks of each node.

A model builder 540, using one or more machine learning operation, may learn and model behavior of one or more nodes using information from the bookkeeping edger 550. The model builder 540 may use an Effective Delta Time ("EDT") to model the "optimal time" an observer node has to wait before the scheduler 520 launches its next task.

An optimizer 530 may use the model builder 540 to report to the scheduler 520 a determined time (e.g., a best or optimal/optimized time) to execute the next task for an observer node. The optimizer 530 may uses the models and the bookkeeping ledger 550 to calculate the time (e.g., the "when time" so that EDT (O, I, when) is enough for the next task of observer node O, the higher the probability that the and its input node (I, based on the statistics information for the input node I of the observer node O. The observer node O has either a producer-consumer or subject-observer dependency to the input node I. The optimizer 530 is generalized to handle observer nodes, which have dependencies to multiple input nodes.

In one aspect, the optimizer 530 may convert sequential workflows into pipelined workflows (e.g., partially or entirely pipelined). The optimizer 530 may automatically, and dynamically, determine and/or calculate a time duration that an observer node should wait prior to the observer node submitting its next task so that the task is scheduled 1) as soon as possible to increase the observer node output rate (i.e., decrease the observer node makespan), and 2) as late as necessary so that the subject nodes of the observer node have sufficient time to generate useful output.

In an additional aspect, the optimizer 530 may associate the in-flight time (e.g., execution) of tasks of the subject nodes causing successful launching and execution of downstream tasks of observer nodes. The optimizer 530 may estimate the optimal wait time after the termination of an observer's task before the launch of the next task for the same observer.

In an additional aspect, the optimizer 530 may use a heuristic involving an effective delta time (EDT). The larger the EDT (O, I, when) becomes for an observer node O and its input node (I), the higher the probability that the input node (I) has produced enough, novel output frames for the observer node O to simultaneously process time, so that the next task of the observer node O generates at least one output-frame.

It should be noted, by way of example only, "EDT (O, I, when)" is being used a function to compute the EDT of a pair of nodes that are connected via an observer-subject dependency. The EDT function receives 3 arguments: (observer_node, subject_node, time_of_computation). The EDT function returns the EDT for a subject_node" for a specific "observer_node" at time "time_of_computation." Again, by way of example only, the (O, I, when) section of the function may be excluded and just used EDT for an observer-subject pair of nodes where node O receives input from node I. Also, as used herein, the term "when" refers to the value or "optimal time" an observer node has to wait before the scheduler 520 launches its next task, which may be determined by the optimizer 530. The term "when" is the best/optimal (i.e., minimum) time that O has the best (i.e., highest) chance of spawning a successful Job (jobs of O consume output frames of I). Also, the terms "job" and "task" may be used interchangeably and/or defined as commonly understood to a person having ordinary skill in the art.

In one aspect, the heuristic may include the following. The longer the observer node O waits before it spawns a new task: a) the greater the percentages of the task succeeding, but b) the lower the optimization efficiency (e.g., less execution time is overlapped with its input nodes). However, every time the observer node O generates, creates, spawns a task prematurely, it wastes computational resources.

Also, various states of the nodes may be defined as used herein (e.g., definitions required by EDT. That is, a task of each node may be in any of the following states: 1) a "Not ready" state (i.e., dependencies to producer/subject nodes are not fulfilled), 2) a "warmup" state (e.g. queuing, input file transferring, etc.), 3) an "In flight" state (e.g., executing, output file transferring, etc.), and/or 4) a "terminated" state that also includes metadata such as, for example, execution time, return code, etc.

It should be noted that, by way of example only, one or more components of the intelligent system 500 such as, for example, the scheduler 520 or the optimizer 530 may perform various machine learning operations and/or determine machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, a priori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 6A:
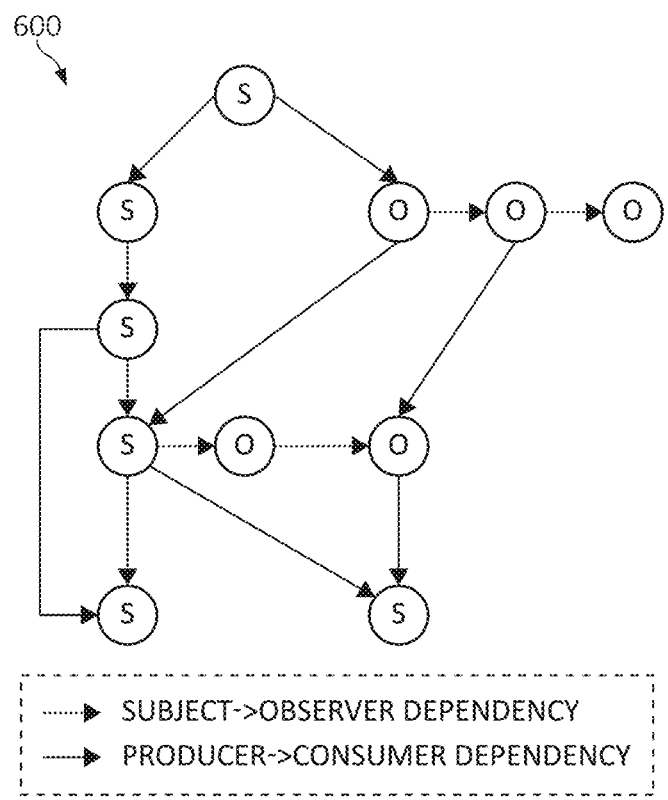
FIG. 6A is an additional block diagram depicting workflow dependencies in which aspects of the present invention may be realized.
Figure 6B:
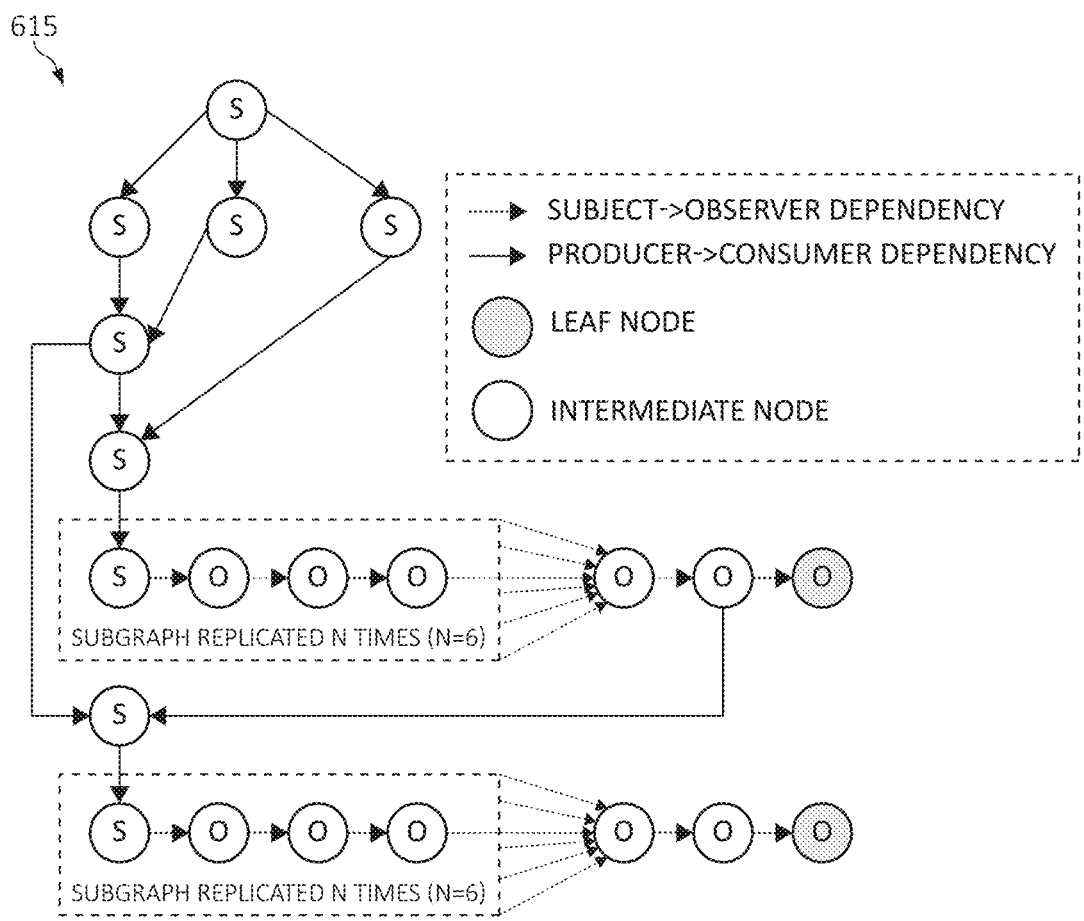
FIG. 6B is an additional block diagram depicting exemplary operations for providing workflow pipeline optimization with workflow dependencies in which aspects of the present invention may be realized.

Turning now to FIGS. 6A-6B, a graph diagram 600 of exemplary workflow dependencies (as in FIG. 6A) and graph diagram 615 providing workflow pipeline optimization with workflow dependencies (as in FIG. 6B). In one aspect, one or more of the components, modules, services, applications, and/or functions described in FIGS. 1-5 may be used in FIG. 6.

As shown in FIG. 6A, various single task nodes ("S") are depicted having only one or more produce-consumer dependencies (e.g., there are no subject-observer dependencies). One or more observer nodes ("O") are also depicted with one or more producer-consumer dependencies one or more subject-observer dependencies. The observer nodes ("O") may generate, create, and/or spawn multiple tasks during the lifetime of the observer nodes ("O"). Both the observer nodes ("O") and the single task nodes ("S") may act as either a producer or subject node to downstream nodes.

Turning now to FIG. 6B, graph 615 depicts the single task nodes ("S") and one or more observer nodes ("O") in a non-optimized workflow. The graph 615 depicts the various subject-observer dependencies and producer-consumer dependencies while also depicted a leaf node (which may be an more observer nodes "O") and various intermediated nodes. In one aspect, the observer nodes ("O") may be required to wait for a selected time period (e.g., 30 seconds) before the observer nodes ("O") launch their next task (e.g., aggressive short-time favors makespan against resource consumption). Also, graph 615 depicts a subgraph replicated N times (where N is a positive integer such as, for example, N=6).

Figure 7:
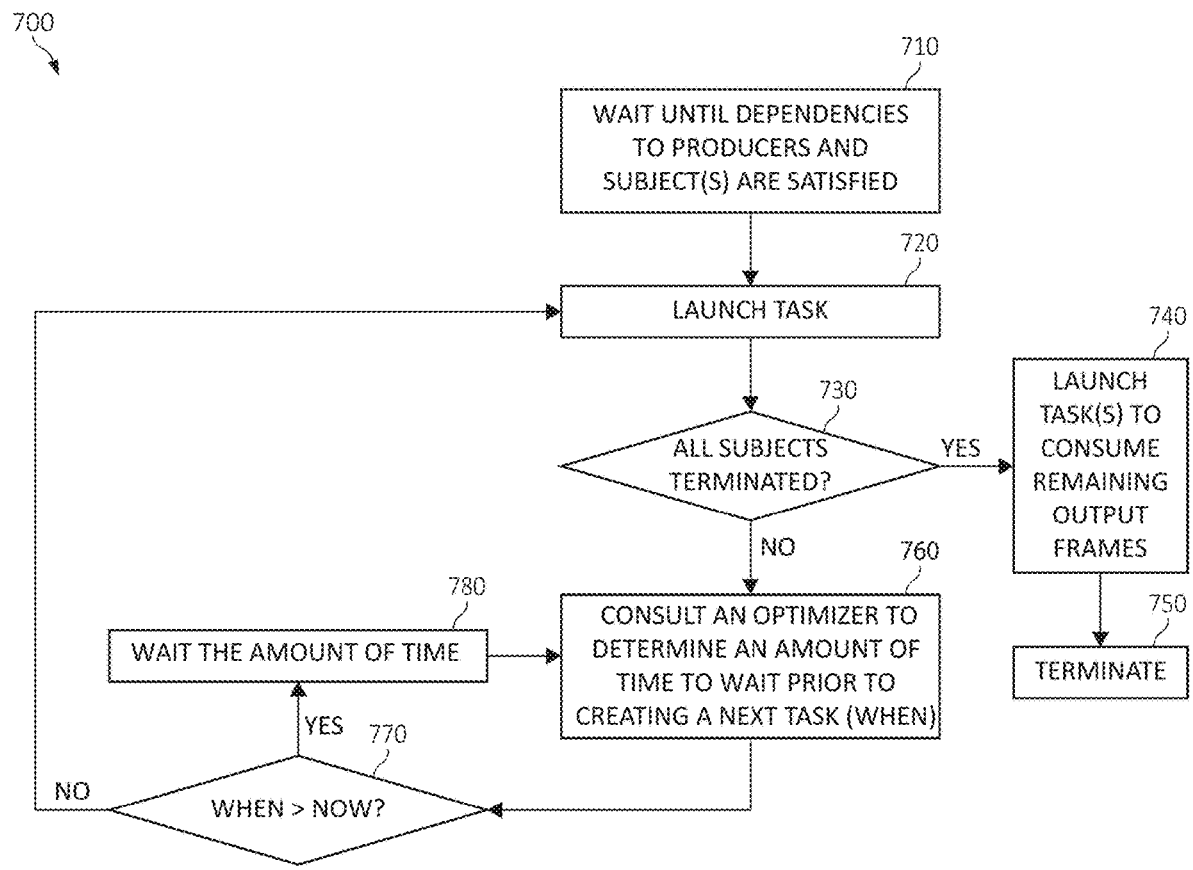
FIG. 7 is a flowchart diagram depicting an exemplary method for providing workflow pipeline optimization by a processor in which aspects of the present invention may be realized.

Turning now to FIG. 7, a method 700 for providing workflow pipeline optimization in a computing environment is depicted. The functionality 700 may be implemented as a method executed as instructions on a machine, where the instructions are included on at least one computer readable medium or on a non-transitory machine-readable storage medium.

The functionality 700 may start by waiting until dependencies to producer and subjects (e.g., producer nodes and subject nodes) are satisfied, as in block 710. A task (of a workflow) may be launched, as in block 720. A determination operation may be performed to determine whether all subjects have terminated, as in block 730. If yes at block 730, one or more task(s) may be launched to consume remaining output frames, as in block 740.

For consuming remaining out frames, consider the following example. Assume a workflow is executing and the workflow contains two nodes; nodes A and B. Nodes A and B may be part of a subject-observer dependency where node A is the subject and node B is the observer. The scheduler may submit the job for node A to a backend and following that it will submit multiple jobs for node B based on the operations of FIG. 7. At some point, node A will terminate, and there may be at least two scenarios: case 1) node B has already processed all of the output frames that node A has generated, and/or case 2) node B has N more frames to consume, where "N" is a positive integer. One or more different policies may be employed to a) determine which of the 2 cases above is true, and b) specifically for case 2) how many jobs for node B it should spawn/generate. In a general case, it is impossible to know how many frames a node produces unless the application is extended or an auxiliary job is used that determines/calculates the number of frames. However, both of these approaches are not helpful because in the first case the nodes are no longer treated or considered as "black-boxes" and in the second case manual computer programming is required for the auxiliary Jobs for every subject node. Such operations are inefficient and computing intensive. Accordingly, the present invention solves this problem by using another heuristic.

First, it is known that at each time a job for node B completes successfully node B has consumed at least 1 output frame of node A. So a policy may be selected and executed at block 740, and the policy then indicates to execute one or more tasks/jobs for node B for as long as they execute successfully. However, that does not account for transient errors. Thus, the policy, at block 740, submits (e.g., via scheduler) a task/job for node B in a loop until at least a selected number of tasks/jobs (e.g., 3 tasks/jobs) in a row fail. Each time node B submits a task/job, node B waits for a selected amount of time (e.g., in the order of a few seconds). From block 740, the functionality 700 may move to block 740 and terminate.

If no at block 730, an optimizer (e.g., an optimizer component) may be consulted to determine an amount of time to wait prior to create a next task (e.g., a subsequent task) (e.g., when to create/launch a next task), as in block 760. At block 770, a determination operation may be performed to determine whether the amount of time to wait to create the next task is greater than the current time period (e.g., the amount of time is greater than zero or equal to zero, where time being equal to zero indicates there is no wait time required and a task may launch). If no at block 770, the functionality 700 may move to block 720. If yes at block 770, a delay in creating/launching the next task is delayed by the amount of the wait time (e.g., the task is not launched until the amount of wait time has expired), as in block 780. From block 780, the functionality 700 may move back to block 760.

Figure 8:
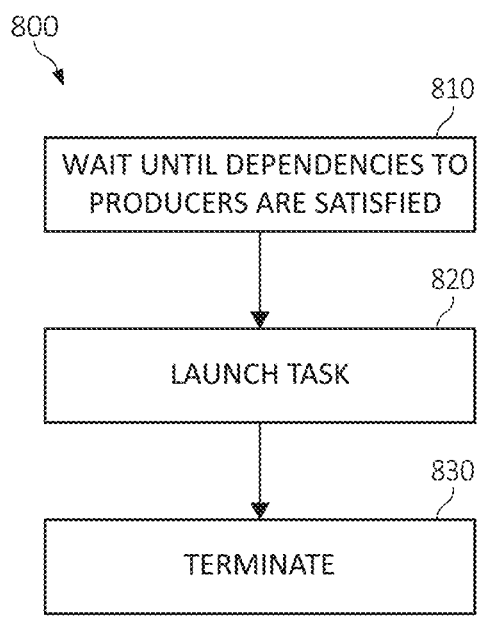
FIG. 8 is a flowchart diagram depicting an exemplary method for scheduling single task nodes for providing workflow pipeline optimization by a processor in which aspects of the present invention may be realized.

Turning now to FIG. 8, an additional method 800 for scheduling single task nodes for providing workflow pipeline optimization in a computing environment is depicted, in which various aspects of the illustrated embodiments may be implemented. The functionality 800 may be implemented as a method executed as instructions on a machine, where the instructions are included on at least one computer readable medium or on a non-transitory machine-readable storage medium.

The functionality 800 may start by waiting until dependencies to producer nodes are satisfied, as in block 810. A task (of a workflow) may be launched, as in block 820. The task may be terminated, as in block 830.

Figure 9:
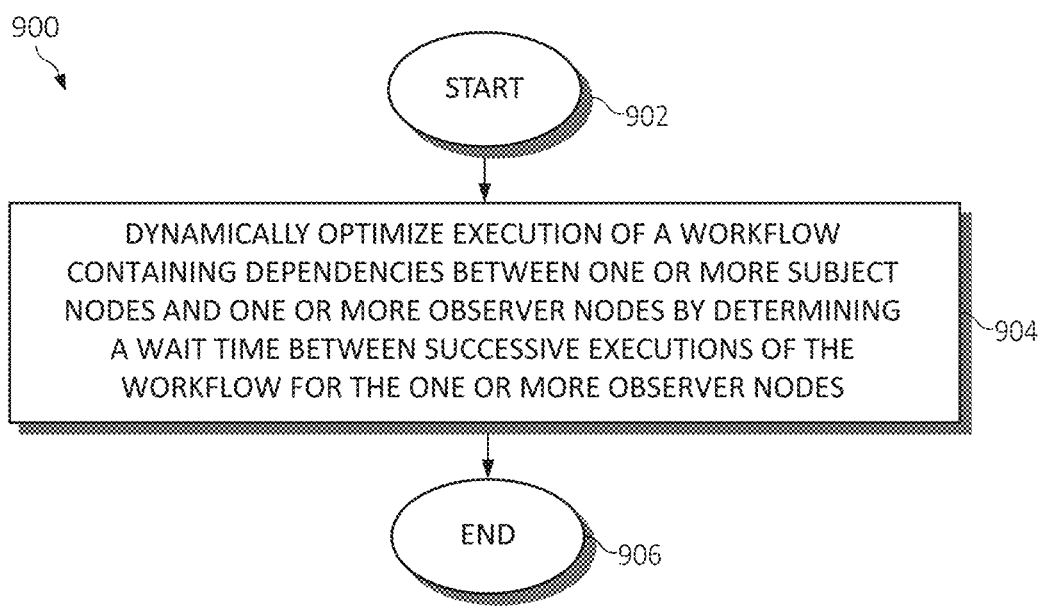
FIG. 9 is a flowchart diagram depicting an additional exemplary method for providing workflow pipeline optimization by a processor, again in which aspects of the present invention may be realized.

Turning now to FIG. 9, an additional method 900 for providing workflow pipeline optimization in a computing environment is depicted, in which various aspects of the illustrated embodiments may be implemented. The functionality 900 may be implemented as a method executed as instructions on a machine, where the instructions are included on at least one computer readable medium or on a non-transitory machine-readable storage medium. The functionality 900 may start in block 902.

Execution of a workflow containing dependencies between one or more subject nodes and one or snore observer nodes may be dynamically optimized by determining a wait time between successive executions of the workflow for the one or more observer nodes, as in block 904. The functionality 900 may end at block 906.

In one aspect, in conjunction with and/or as part of at least one block of FIGS. 7-9, the operations of methods 700, 800 and/or 900 may include each of the following. The operations of methods 700, 800 and/or 900 may convert sequential tasks into one or more pipeline tasks for the one or more workflows.

The operations of methods 700, 800 and/or 900 may schedule one or more tasks of the one or more observer nodes in the workflow according to the wait time and a scheduling policy. The operations of methods 700, 800 and/or 900 may suggest one or more wait times as the wait time for successive tasks of the one or more observer nodes according to a machine learning model, state changes of a plurality of nodes or tasks of the workflow, or a combination thereof.

The operations of methods 700, 800 and/or 900 may maintain state changes for each task in the workflow and each of a plurality of nodes, and the plurality of nodes include the one or more subject nodes ad the one or more observer nodes. The operations of methods 700, 800 and/or 900 may collect information between a plurality of nodes, tasks, and dependencies between the plurality of nodes and initialize machine learning operation to learn and monitor behavior of each of the plurality of nodes and the wait time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, performed by a processor, for providing workflow optimization in a computing environment including a scheduler, an optimizer, a model builder and a bookkeeping ledger, comprising steps of:
receiving submission of one or more tasks of a workflow by the scheduler;
collecting, by the scheduler, execution time information of the one or more tasks, wherein the execution time information is stored in the bookkeeping ledger;
dynamically optimizing, by the scheduler, execution of the workflow containing dependencies between one or more subject nodes and one or more observer nodes by determining a wait time between successive executions of the workflow for the one or more observer nodes based on the execution time information, wherein the wait time is determined by a machine learning operation initiated by the model builder to model each one of the one or more subject nodes and the one or more observer nodes according to the execution time information stored in the bookkeeping ledger, wherein the optimizer uses an output of the machine learning operation to compute the wait time, report the wait time to the scheduler, and convert the workflow from a sequential workflow to a pipelined workflow based on the wait time, and wherein the wait time is indicative of an effective delta time (EDT) representative of a time period necessary for the one or more subject nodes to produce a number of novel output frames of the one or more tasks which are simultaneously able to be processed by the one or more observer nodes while accounting for an in-flight time of the one or more tasks causing successful processing of downstream tasks of the one or more observer nodes dependent on the one or more tasks; and
launching, by the scheduler, the downstream tasks of the one or more observer nodes to consume the number of novel output frames.

2. The method of claim 1, further including converting sequential tasks of the workflow into one or more pipeline tasks for a pipeline of one or more workflows.

3. The method of claim 1, further including scheduling the one or more tasks of the one or more observer nodes in the workflow according to the wait time and a scheduling policy.

4. The method of claim 1, further including suggesting one or more wait times as the wait time for successive tasks of the one or more observer nodes according to a machine learning model, state changes of a plurality of nodes or tasks of the workflow, or a combination thereof.

5. The method of claim 1, further including maintaining state changes for each task in the workflow and each of a plurality of nodes, wherein the plurality of nodes include the one or more subject nodes and the one or more observer nodes.

6. The method of claim 1, further including collecting information between a plurality of nodes, tasks, and dependencies between the plurality of nodes, wherein the plurality of nodes include the one or more subject nodes and the one or more observer nodes.

7. A system for providing workflow optimization, performed by a processor in a computing environment including a scheduler, an optimizer, a model builder and a bookkeeping ledger, comprising:
one or more computers incorporating the processor and with executable instructions that when executed cause the system to:
receive submission of one or more tasks of a workflow by the scheduler;
collect, by the scheduler, execution time information of the one or more tasks, wherein the execution time information is stored in the bookkeeping ledger;
dynamically optimize, by the scheduler, execution of the workflow containing dependencies between one or more subject nodes and one or more observer nodes by determining a wait time between successive executions of the workflow for the one or more observer nodes based on the execution time information, wherein the wait time is determined by a machine learning operation initiated by the model builder to model each one of the one or more subject nodes and the one or more observer nodes according to the execution time information stored in the bookkeeping ledger, wherein the optimizer uses an output of the machine learning operation to compute the wait time, report the wait time to the scheduler, and convert the workflow from a sequential workflow to a pipelined workflow based on the wait time, and wherein the wait time is indicative of an effective delta time (EDT) representative of a time period necessary for the one or more subject nodes to produce a number of novel output frames of the one or more tasks which are simultaneously able to be processed by the one or more observer nodes while accounting for an in-flight time of the one or more tasks causing successful processing of downstream tasks of the one or more observer nodes dependent on the one or more tasks; and
launch, by the scheduler, the downstream tasks of the one or more observer nodes to consume the number of novel output frames.

8. The system of claim 7, wherein the executable instructions further convert sequential tasks of the workflow into one or more pipeline tasks for a pipeline of one or more workflows.

9. The system of claim 7, wherein the executable instructions further schedule the one or more tasks of the one or more observer nodes in the workflow according to the wait time and a scheduling policy.

10. The system of claim 7, wherein the executable instructions further suggest one or more wait times as the wait time for successive tasks of the one or more observer nodes according to a machine learning model, state changes of a plurality of nodes or tasks of the workflow, or a combination thereof.

11. The system of claim 7, wherein the executable instructions further maintain state changes for each task in the workflow and each of a plurality of nodes, wherein the plurality of nodes include the one or more subject nodes and the one or more observer nodes.

12. The system of claim 7, wherein the executable instructions further collect information between a plurality of nodes, tasks, and dependencies between the plurality of nodes, wherein the plurality of nodes include the one or more subject nodes and the one or more observer nodes.

13. A computer program product for providing workflow optimization performed by a processor in a computing environment including a scheduler, an optimizer, a model builder and a bookkeeping ledger, the computer program product comprising a non-transitory computer-readable storage medium having computer-readable program code portions stored therein, the computer-readable program code portions comprising:

an executable portion that receives submission of one or more tasks of a workflow by the scheduler;

an executable portion that collects, by the scheduler, execution time information of the one or more tasks, wherein the execution time information is stored in the bookkeeping ledger;

an executable portion that dynamically optimizes, by the scheduler, execution of the workflow containing dependencies between one or more subject nodes and one or more observer nodes by determining a wait time between successive executions of the workflow for the one or more observer nodes based on the execution time information, wherein the wait time is determined by a machine learning operation initiated by the model builder to model each one of the one or more subject nodes and the one or more observer nodes according to the execution time information stored in the bookkeeping ledger, wherein the optimizer uses an output of the machine learning operation to compute the wait time, report the wait time to the scheduler, and convert the workflow from a sequential workflow to a pipelined workflow based on the wait time, and wherein the wait time is indicative of an effective delta time (EDT) representative of a time period necessary for the one or more subject nodes to produce a number of novel output frames of the one or more tasks which are simultaneously able to be processed by the one or more observer nodes while accounting for an in-flight time of the one or more tasks causing successful processing of downstream tasks of the one or more observer nodes dependent on the one or more tasks; and an executable portion that launches, by the scheduler, the downstream tasks of the one or more observer nodes to consume the number of novel output frames.

14. The computer program product of claim 13, further including an executable portion that converts sequential tasks of the workflow into one or more pipeline tasks for a pipeline of one or more workflows.

15. The computer program product of claim 13, further including an executable portion that schedules the one or more tasks of the one or more observer nodes in the workflow according to the wait time and a scheduling policy.

16. The computer program product of claim 13, further including an executable portion that suggest one or more wait times as the wait time for successive tasks of the one or more observer nodes according to a machine learning model, state changes of a plurality of nodes or tasks of the workflow, or a combination thereof.

17. The computer program product of claim 13, further including an executable portion that:

maintains state changes for each task in the workflow and each of a plurality of nodes, wherein the plurality of nodes include the one or more subject nodes and the one or more observer nodes; and collects information between the plurality of nodes, each of the tasks, and dependencies between the plurality of nodes.

* * * * *